Jan. 31, 1950

W. I. McCORD 2,496,102

STROBOSCOPIC PROJECTION OF INTERMITTENT
FILM ON TELEVISION CAMERAS

Filed Dec. 18, 1945

Willis Irvine McCord INVENTOR

BY Charles W. Mortimer

Patented Jan. 31, 1950

2,496,102

UNITED STATES PATENT OFFICE 2,496,102

STROBOSCOPIC PROJECTION OF INTERMITTENT FILM ON TELEVISION CAMERAS

Willis I. McCord, Little Falls, N. J., assignor to Allen B. Du Mont Laboratories, Inc., Passaic, N. J., a corporation of Delaware Application December 18, 1945, Serial No. 637,710

1 Claim. (Cl. 178—7.2)

This invention relates to a device by means of which motion pictures are projected in such a way that they can be transmitted by television transmitters that are used for transmitting purposes in the usual way.

With this invention moving pictures are projected upon the screen of a television transmitter at intervals when the beam is blanked at the end of each field scanning. Provision is made so that this can be accomplished whether the pictures are recorded upon 16 mm. film at 24 frames per second or upon 35 mm. film at 24 frames per second.

The 60 cycle vertical blanking on the pickup tube is synchronized with the flashing of the strobolamp by shifting the phase of the synchronization pulses used for generating the sweeps and blanking used with the pickup tube 18.

In carrying out the invention the shutter used with motion picture projectors is dispensed with and intense light is projected through the moving picture frames at the rate of sixty times per second during periods when these frames are stationary in the projector and the cathode ray beam is blanked off in the television transmitter tube.

Figure 1:
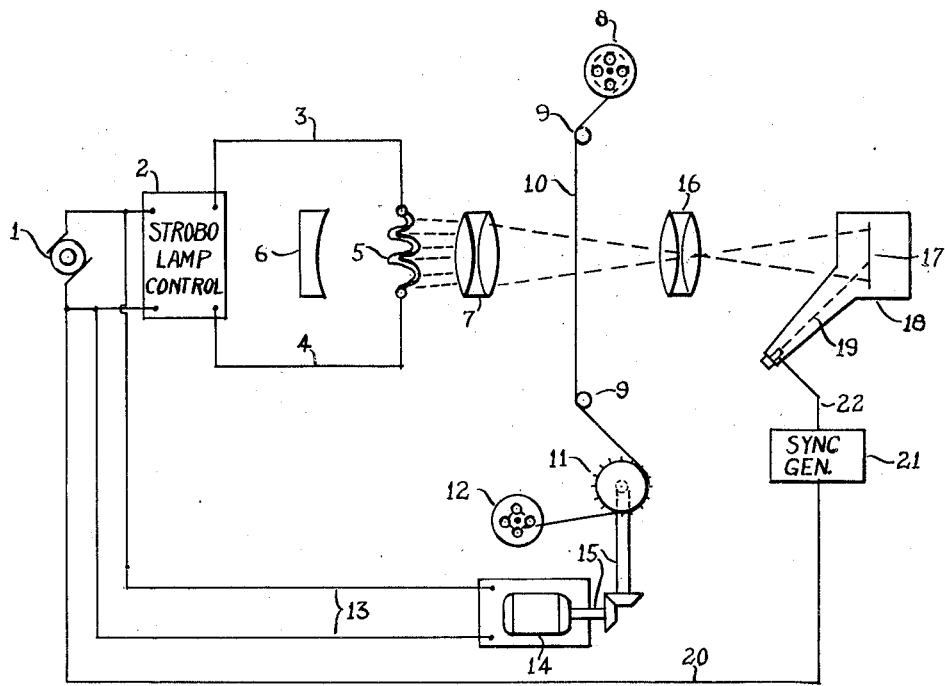
Figure 2:
Figure 3:
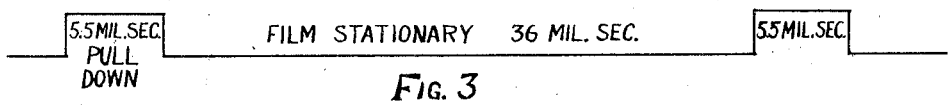
Figure 4:
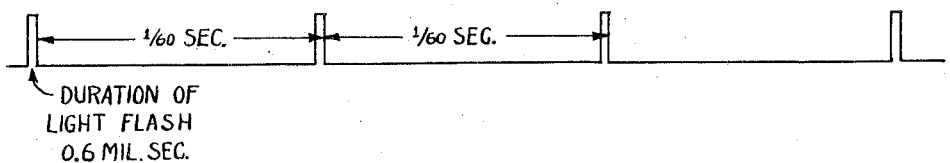

The invention may be understood from the description in connection with the accompanying drawing in which:

Fig. 1 is a somewhat diagrammatic view of apparatus illustrating an embodiment of the invention; and Figs. 2-4 are diagrams which indicate time intervals of operation.

In the drawing, reference character 1 indicates a generator of 60 cycle current which may be at 115 volt potential. This generator is connected to any of the well-known types of stroboscope lamp control devices, indicated by the block diagram 2 which turn on the lamp for short intervals of time that may be varied to some extent.

Leads 3 and 4 from the lamp control 2 extend to the stroboscope lamp 5 which is of a type that produces a very brilliant light which may for example have a duration of about one fifteen hundredth of a second, each one sixtieth of a second as controlled by the lamp control 2. This source of light operates at a temperature considerably lower than that of tungsten bulbs or arc lamps, so that the danger of overheating or burning the film is accordingly decreased.

A reflector 6 is located behind the lamp 5 and a lens system 7 is located in front of this lamp.

A reel 8 is provided upon which the film of a moving picture has been wound. The film is guided over the rollers 9 to an intermittent pull down mechanism indicated at 11. The film 10 passes from the pull down 11 and is wound upon a reel 12.

Leads 13 extend from the generator 1 to a synchronous motor 14 which drives the intermittent pull down 11 in the known way through connections 15.

A lens system 16 is located between the film 10 and the photosensitive screen 17 of the television transmitter tube 18. The cathode ray or beam 19 of this tube is blanked in the usual way during its return trace or time at the end of each field scanning, or sixty times per second with the present standards.

A lead 20 extends from the generator 1 to the synchronizing generator 21 of the known sort to assure that the scanning beam 19 is synchronized with the lamp 5 and with the movement of the film 10. A lead 22 extends from the generator 21 to the tube 18.

The operation is as follows:

As shown in Fig. 2, the beam is blanked ⅚ of a thousandth of a second at the finish of each field scanning which takes place 60 times per second. The time for scanning each field is 15⅚ thousandths of a second as shown in this Fig. 2.

As shown in Fig. 3 the intermittent pull down 11 for the film, which is synchronized by motor 14 with the flashes of the lamp 5, requires approximately 5.5 thousandths of a second and the film remains stationary for approximately 36 thousandths of a second each time after it has been pulled down and stops.

As shown in Fig. 4, the flashes of light from the lamp 5 are caused to take place during the return time intervals of the beam 19 while it is blanked for ⅚ of a thousandth of a second as shown in Fig. 2. At this time the film is stationary and the light passes through this film onto the screen 17 during these intervals of time as indicated in Fig. 4 for 0.6 thousandths of a second each 60th of a second.

Since the blanking of the beam 17 of the cathode-ray tube 18 continues for ⅚ of a thousandths of a second during its return trace as shown in Fig. 2 and occurs 60 times per second in accordance with the present standards, as shown in Fig. 2, and the lamp 5 is synchronized with the blanking time to flash for 0.6 of a thousandth of a second each sixtieth of a second, the moving picture frames are projected upon the screen 17 at the rate of 60 times per second at intervals when these frames are stationary and while the beam 19 is blanked. Since the duration of the flash of light from lamp 5 is 0.6 of a thousandths of a second and occurs sixty times per second, as shown in Fig. 4, in synchronization with the cathode ray blanking signals as shown in Fig. 2, the result is that a picture is projected upon the screen 17 every sixtieth of a second when the beam 19 is blanked. Due to the charges thereby produced on the screen material of tube 18, when the beam 19 scans this screen between blanking intervals, video signals are produced in the known way for transmission.

As shown in Fig. 3, the pull down mechanism for the film 10 is so synchronized with the flashes of lamp 5 that the approximately 5.5 thousandths of a second pull down intervals do not coincide with or overlap the time intervals (Fig. 4) in which these light flashes occur.

What is claimed is:

Apparatus for televising the image on a motion picture film comprising a source of light, means for supporting and intermittently moving said film at motion picture frame rates, a television pickup tube having an electron beam, and a pulse generating circuit for blanking said beam at both horizontal and vertical television frequency rates, said source of light being stroboscopic and connected to said circuit to be operated at the vertical blanking rate of said tube and synchronized therewith, the duration of each light pulse being less than the duration of said vertical blanking, said film being positioned between said source and said tube to be intermittently illuminated by said light, said film being stationary during periods of illumination by said light.

WILLIS I. McCORD.

REFERENCES CITED

The following references are of record in the file of this patent:

UNITED STATES PATENTS

| Number | Name | Date |
| --- | --- | --- |
| 1,206,984 | Bloom | Dec. 5, 1916 |
| 1,262,590 | Newhouse | Apr. 9, 1918 |
| 1,648,687 | Hoxie | Nov. 8, 1927 |
| 2,166,214 | Kell | July 18, 1939 |
| 2,186,013 | Edgerton | Jan. 9, 1940 |
| 2,303,960 | Seeley | Dec. 1, 1942 |
| 2,343,971 | Goldsmith | Mar. 14, 1944 |
| 2,385,397 | Blackburn | Sept. 25, 1945 |

FOREIGN PATENTS

| Number | Country | Date |
| --- | --- | --- |
| 29,832 | Great Britain | Dec. 22, 1910 |
| 777,409 | France | Nov. 26, 1934 |
| 502,051 | Great Britain | Aug. 11, 1938 |